United States Patent
Loafman

(10) Patent No.: US 8,195,908 B2
(45) Date of Patent: *Jun. 5, 2012

(54) SYSTEM AND METHOD OF SQUEEZING MEMORY SLABS EMPTY

(75) Inventor: Zachary Merlynn Loafman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 835 days.

This patent is subject to a terminal disclaimer.

(21) Appl. No.: 11/778,054

(22) Filed: Jul. 15, 2007

(65) Prior Publication Data

US 2008/0189503 A1 Aug. 7, 2008

(51) Int. Cl.
*G06F 12/02* (2006.01)
(52) U.S. Cl. ...................................................... 711/170
(58) Field of Classification Search ................... None
See application file for complete search history.

(56) References Cited

U.S. PATENT DOCUMENTS

| | | | |
|---|---|---|---|
| 5,293,614 A | 3/1994 | Ferguson et al. | |
| 5,809,554 A | 9/1998 | Benayon et al. | |
| 6,125,434 A * | 9/2000 | Willard et al. | 711/170 |
| 6,247,105 B1 | 6/2001 | Goldstein et al. | |
| 6,249,793 B1 | 6/2001 | Printezis et al. | |
| 6,249,852 B1 * | 6/2001 | Benayon et al. | 711/170 |
| 6,349,312 B1 | 2/2002 | Fresko et al. | |
| 6,412,053 B2 | 6/2002 | Bonola | |
| 6,496,912 B1 | 12/2002 | Fields et al. | |
| 6,598,141 B1 | 7/2003 | Dussud et al. | |
| 6,604,182 B1 | 8/2003 | Sexton et al. | |

OTHER PUBLICATIONS

The Slab Allocator: An Object-Caching Kernel Memory Allocator, by Jeff Bonwick of Sun Microsystems.
Magazines and VMEM: Extending the Slab Allocator to Many CPUs and Arbitrary Resources, by Jett Bonwick of Microsystems and Jonathan Adams of California Institute of Tecnnolgy.

* cited by examiner

*Primary Examiner* — Duc Doan
(74) *Attorney, Agent, or Firm* — James L. Baudino; John D. Flynn

(57) ABSTRACT

A system and method of squeezing slabs of memory empty are provided. A slab is a block of allocated memory space that is dedicated to holding one type of data. When it is determined that a slab of memory is to be squeezed empty, no object may be allocated from the slab. That is, new data is precluded from being placed in any unused space of the slab. Further, data is also precluded from being placed in any space in the slab that becomes unused anytime thereafter. When the slab becomes empty, the slab is de-allocated.

7 Claims, 8 Drawing Sheets

SYSTEM AND METHOD OF SQUEEZING MEMORY SLABS EMPTY

BACKGROUND OF THE INVENTION

1. Technical Field

The present invention is directed to memory systems. More specifically, the present invention is directed to a system and method of squeezing slabs of memory empty.

2. Description of Related Art

Presently, memory fragmentation is one of the biggest problems facing modern memory management subsystems. Memory fragmentation occurs when system memory has a multiplicity of partially-used allocated blocks of space.

One of the methods that has been used to reduce memory fragmentation is to allocate memory space in slabs. A slab is an allocated space (e.g., a block of 16 contiguous pages) of memory that is dedicated to hold only fixed sized objects (i.e., one type of data). For example, slabs may be allocated to hold only inodes. An inode is a data structure that contains system information about a file with which it is associated. When inodes are held in a slab of memory, they are in one area of the memory instead of being scattered all around. This helps in reducing memory fragmentation.

Slab allocation is discussed in THE SLAB ALLOCATOR: AN OBJECT-CACHING KERNEL MEMORY ALLOCATOR by Jeff Bonwick of Sun Microsystems as well as in MAGAZINES AND VMEM: EXTENDING THE SLAB ALLOCATOR TO MANY CPUs AND ARBITRARY RESOURCES by Jeff Bonwick of Sun Microsystems and Jonathan Adams of California Institute of Technology. The disclosures of both references are herein incorporated by reference.

When the system is in need of a large section of memory space and none is available, the system may decide to de-allocate a slab. However, since a block of allocated memory space may not be de-allocated until empty, a need therefore exists for a system and method of squeezing slabs of memory empty in order to facilitate de-allocation.

SUMMARY OF THE INVENTION

The present invention provides a system and method of squeezing slabs of memory empty. A slab is a block of allocated memory space that is dedicated to holding one type of data. When it is determined that a slab of memory is to be squeezed empty, no object may be allocated from the slab. That is, new data is precluded from being placed in any unused space of the slab. Further, data is also precluded from being placed in any space in the slab that becomes unused anytime thereafter. When the slab becomes empty, the slab is de-allocated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3a is a conceptual view of an exemplary header for the slab in FIG. 1a.

DETAILED DESCRIPTION OF THE PREFERRED EMBODIMENT

To present a uniform memory model to all executing programs, modern operating systems abstract memory addresses used by the system's virtual memory manager (VMM). (The VMM is a process that is primarily responsible for managing the use of both main memory and virtual memory. To do so, the VMM keeps track of each page of data that is in memory and swaps pages to and from the storage device both on demand and routinely.) This memory abstraction creates a range of available memory addresses that is referred to as an address space.

When memory is requested from the system, a free space of the requested size (i.e., the requested number of free pages) must exist in the system memory. If a free space does not exist, the system may have to swap pages of data in and out of memory. This may impact the performance of the system. The present invention is used to reduce the likelihood that the system may run out of free pages. Note that it is assumed that there is a standard heap allocator and an interface to the VMM to disclaim pages in the system. A heap is a process that is used for allocating and freeing objects dynamically for use by a program. An object is an opaque block of memory space. An opaque block of memory space may not be modified by the allocator.

Figure 1A:
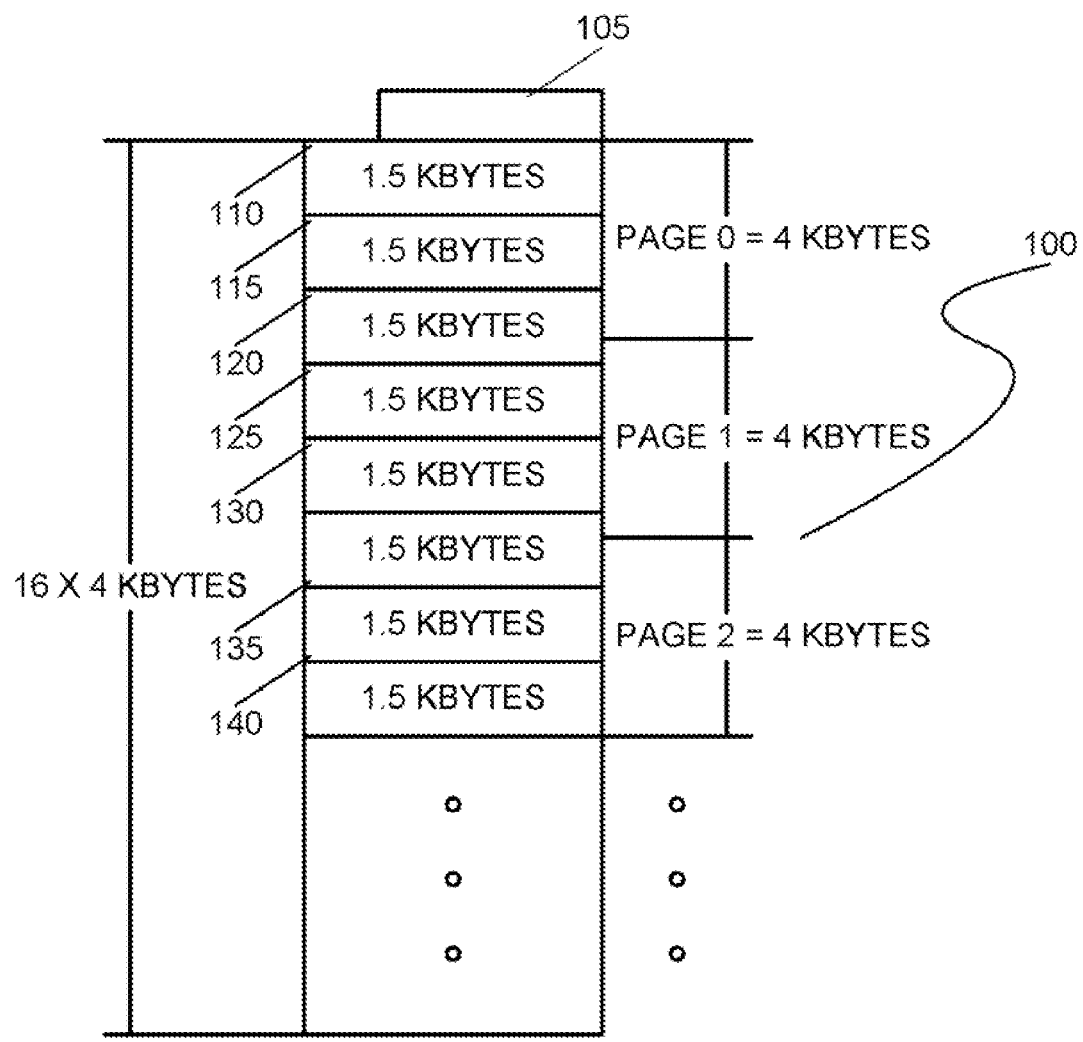
FIG. 1a depicts a conceptual view of an exemplary slab of memory.

With reference now to the figures, FIG. 1a depicts a conceptual view of an exemplary slab of memory 100. The slab 100 is made of 16 contiguous pages (i.e., 16×4 kbytes). In this particular example, the slab is made of 1.5 kbytes objects and presently seven (7) of the objects contain data (objects 110-140). The rest of the slab 100 is empty. The slab also has a header 105. As will be explained later, the header 105 contains an object-free list as well as some other control structures.

Figure 2:
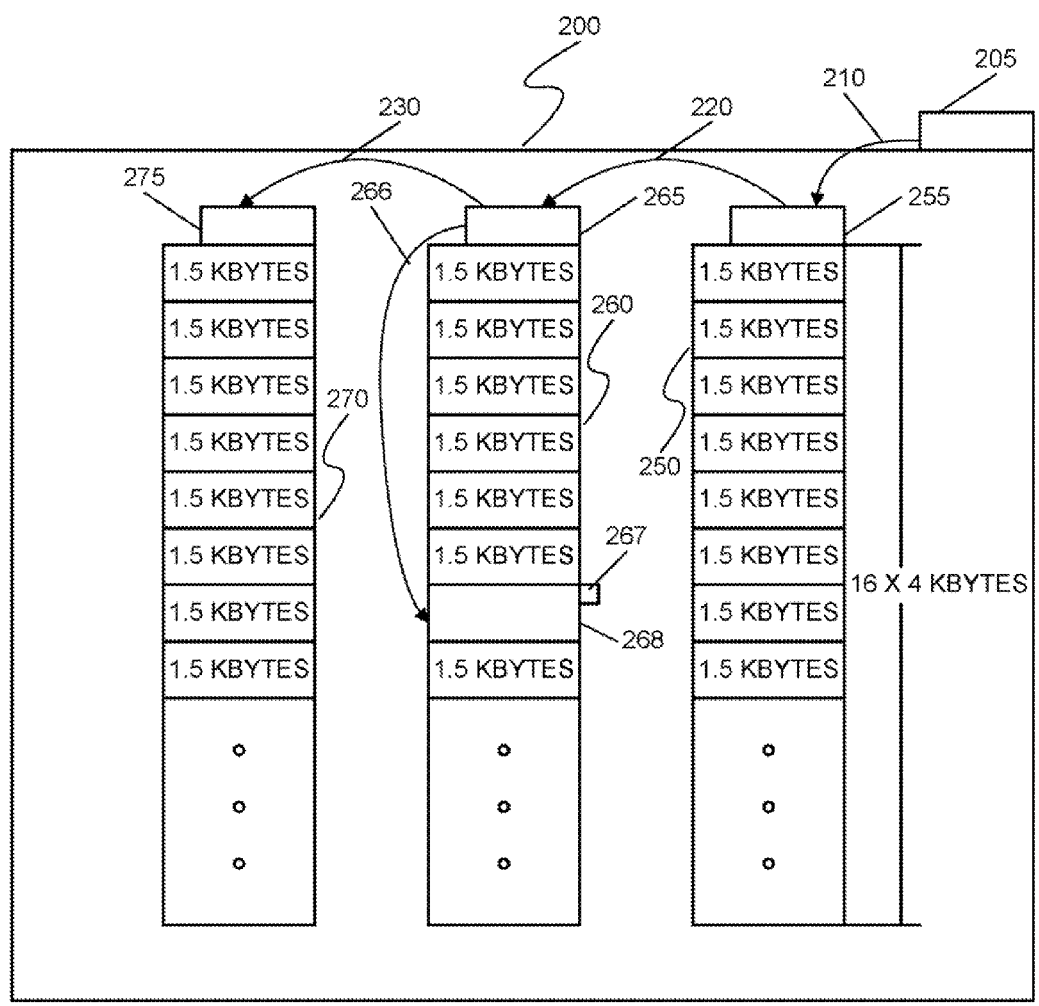
FIG. 2 depicts a conceptual view of an exemplary pile 200 of slabs.

A collection of slabs is called a pile. FIG. 2 depicts a conceptual view of an exemplary pile 200 of slabs (slabs 250, 260 and 270). Each pile has a maximum number of pages that it can contain. Note that all slabs in a pile are divided into same sized objects.

A pile has to be initialized. Initialization of the pile 200 consists of initializing a sorted linked list of slabs as well storing some tracking fields into header 205. Specifically, a pointer (pointer 210) from header 205 of pile 200 points to header 255 of slab 250 (i.e., the first slab in the pile). Pointer 220 from header 255 of slab 250 points to header 265 of slab 260. Likewise, pointer 230 from header 265 of slab 260 points to header 275 of slab 270. Basically, a pointer from the header of an immediately preceding slab points to the header of an immediately succeeding slab in each pile. Sizes of the slabs and of the objects desired are also entered in header 205. The slabs are sorted into sub-groups depending on whether their allocated space is full (i.e., no free objects) or partially full.

Before a slab can be used, it has to be initialized as well. To initialize a slab is to divide the slab into a plurality of same sized objects. Thus in this example, each slab is divided into 1.5 kbytes objects. Note, however, that a slab is not allocated until needed. For example, if more pieces of data of the type for which the slabs in the pile 200 are constructed is being brought into memory, they are stored in successive free objects in the first slab 250. When the slab 250 is full and if more data of the same type is being brought into memory, slab 265 will be constructed and initialized. Optimal slab sizes are dependent upon the data to be stored therein.

In any case, when a slab is initialized, an object handle is added to each free object. The handle is used to help track free objects as well as to provide a pointer back to the slab when the object is no longer free. Specifically, if a slab has a free object, a pointer from its header will point to the free object. For example, slab 260 has a free object 268. Thus, pointer 266 from header 265 points to object 268. If there is another free object down in the slab, a pointer from handle 267 of the free object 268 will point to that empty object and so on. Thus, a linked list of pointers is used to indicate all free objects in a slab.

Figure 3A:
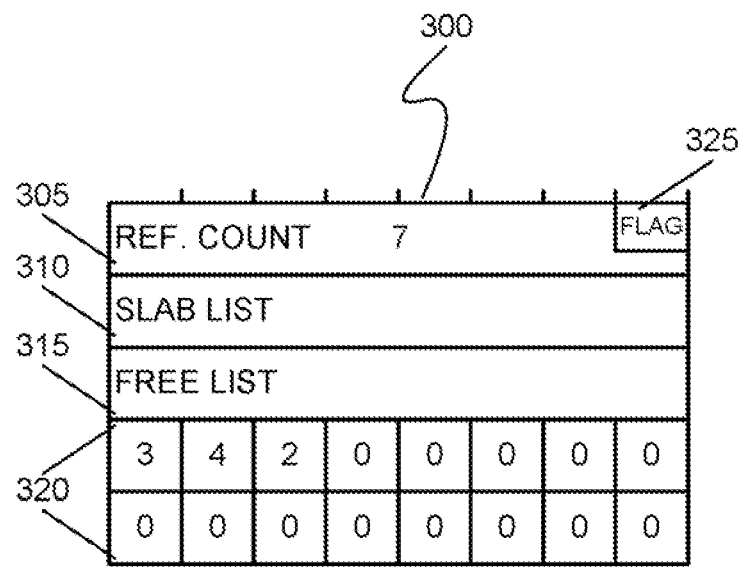

FIG. 3a is a conceptual view of an exemplary slab header 300 in accordance with the invention. The slab header 300 has a reference count 305, a slab list 310, an object free list 315, a flag 325 and a page reference count array 320. The reference count 305 contains the number of objects in the slab. The slab list is a linked list of other slabs in the pile and the free list 315 is a linked list of free objects. The flag 325 is used to indicate whether a slab is to be squeezed.

The page reference count array 320 is used to keep tab of all allocated pages in the slab that have data therein. Each location in the array 320 is associated with a page in the slab. Returning to the slab in FIG. 1a where the first seven objects in the slab are filled with data, three pages are used (pages 0, 1 and 2). Page zero (0) contains data from three objects, objects 110, 115 and 120. Thus, in the location of the array that is associated with page zero (0), a reference count of three (3) is entered. Page 1, however, contains data from four objects (objects 120, 125, 130 and 135). Hence, a page count reference of four (4) is entered in its associated location in the array 320. Similarly, page 2 has data from two objects, objects 135 and 140, therefore a reference count of two (2) is entered in its associated location in the array. The other locations of the array have a zero reference count since their associated pages are empty.

The invention makes use of four function calls: (1) ALLOC; (2) FREE; (3) CONFIG_MAX; and (4) CONFIG_CALLBACK. Each one of these functions will now be explained.

ALLOC is a function that is used to allocate an object off a slab. When ALLOC is called, the free list 315 of each slab is scrutinized in their sorted order. The first slab to contain a free object will be used. Then, the first free object on the free list will be allocated, if the slab contains more than one empty object. The object will then be removed from the free list 315 (see FIGS. 3a and 3b) and the slab object reference count 305 will be updated (i.e., incremented).

If none of the slabs contain a free object, the heap allocator will allocate a new slab that will be added to the pile, certain conditions permitting. For example, the maximum page count of a pile may not be exceeded. Thus, if by adding a new slab the page count of the pile will exceed its limit, the allocation will be denied. If a slab is added to the pile, the slab will be initialized before the object is stored therein.

FREE is a function that is used to de-allocate objects. Depending on whether an object to be de-allocated is in a slab targeted to be squeezed, the following may occur: (1) if the slab is not a targeted slab (i.e., flag 325 is not set), the object will be de-allocated by simply adding the object back onto the free list 315 of the slab and decrementing the object reference count 305. When the object reference count 305 reaches zero (0), the slab will be de-allocated using the heap allocator; (2) if the slab from which the object is to be de-allocated is a slab marked to be squeezed, the object will not be put back on the free list since the slab is to be de-allocated. The reference count, however, will be decremented and when it reaches zero, the slab will be de-allocated. In addition, the page reference count 320 will be tracked. If, when removing the object there is a page that does not contain data anymore, the page will be disclaimed (i.e., any bindings to physical memory associated with the page will be removed); thus reducing the memory usage of the slab.

Figure 1B:
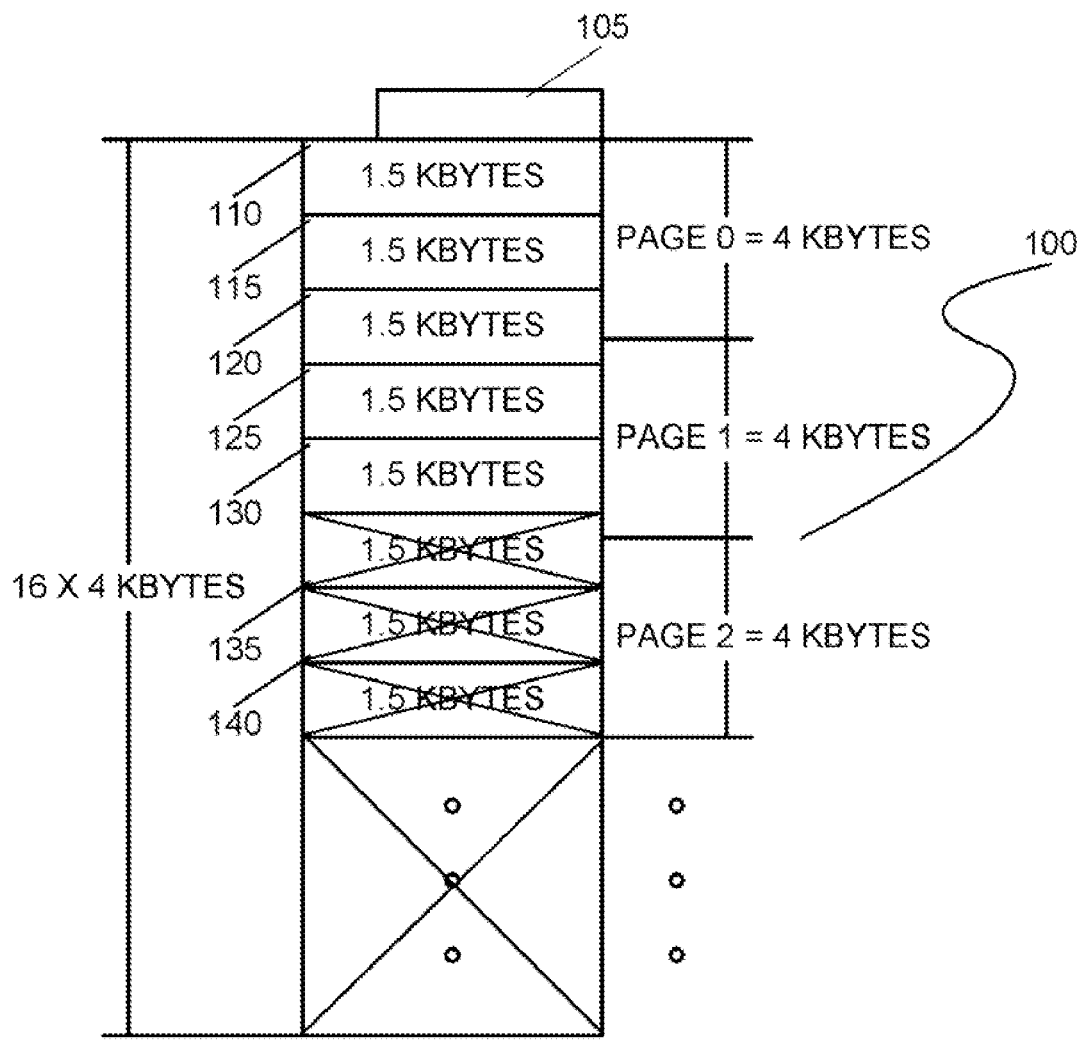
FIG. 1b depicts a conceptual view of an exemplary slab of memory with crossed out sections that have been released back to VMM.

As an example, suppose the slab in FIG. 1a is marked to be squeezed (i.e., flag 325 is set), all its free pages will be disclaimed. Thus, only the first three pages that contain the seven allocated objects (objects 110-140) will remain in the slab. Now suppose the last two objects (objects 135 and 140) become free, then the slab will be as shown in FIG. 1b. In FIG. 1b, the crossed out sections have been disclaimed and thus are not available anymore to be used.

Figure 3B:
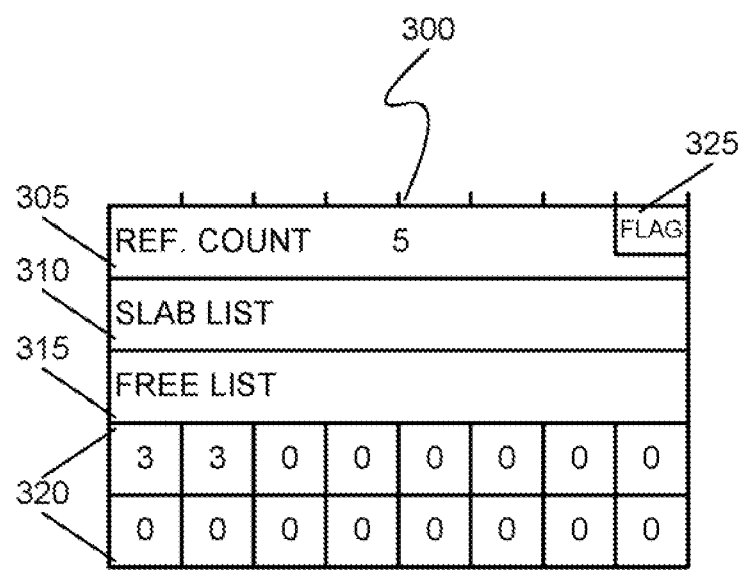
FIG. 3b is a conceptual view of an exemplary header for the slab in FIG. 1b.

The object reference count in header 300 will be decremented to five (see FIG. 3b). The free list 315 will be zero and the flag 325 will be set. The page reference count array 320 will be as shown. Particularly, the location associated with page zero (0) will have an entry of three (3) therein since page zero (0) continues to hold the data of three objects. The entry in the location associated with page one (1), however, will be updated down to three (3) since now it only holds data of three objects instead of four objects (see FIGS. 1a and 1b). Likewise, the entry in the location associated with page two (2) will be decremented to zero (0) since when objects 135 and 140 are de-allocated, page two (2) no longer holds any data. According to the invention, since page two (2) no longer holds data, it may be disclaimed.

CONFIG_MAX is used to reconfigure a maximum page count of a pile. That is, at any given time an executing application may invoke the CONFIG_MAX function to reconfigure the maximum number of pages that a pile may contain. Note that the application may choose any time that it deems appropriate to call the CONFIG_MAX function. If the current number of pages in the pile exceeds the reconfigured number, then a squeeze operation must occur.

When a squeeze operation is to occur, the invention first determines the number of objects in each slab. This can easily be done by consulting reference count 305 of each header of a slab. The first partially-filled slab will be chosen to be squeezed. The flag 325 in the header of the slab to be squeezed is set. To squeeze a slab, the invention iterates through the objects to determine which objects are actually allocated. While doing so, the page reference count array 320 is updated. Any allocated page that does not hold data for any of the objects will be disclaimed and the slab will be moved to the "full" list of slabs, since no more data may be placed therein.

Further, if the application has supplied a callback function, the objects in the slab that are still allocated are iterated over and the callback function is called with a reference to the object for each allocated object. The callback function is free to do what it wants with the referenced object. Ideally, the callback function can free the referenced object, or mark it to be freed later.

CONFIG_CALLBACK is the command used by an application to provide a callback function. As mentioned above, a callback function is free to do what it wants with any referenced object.

Figure 4:
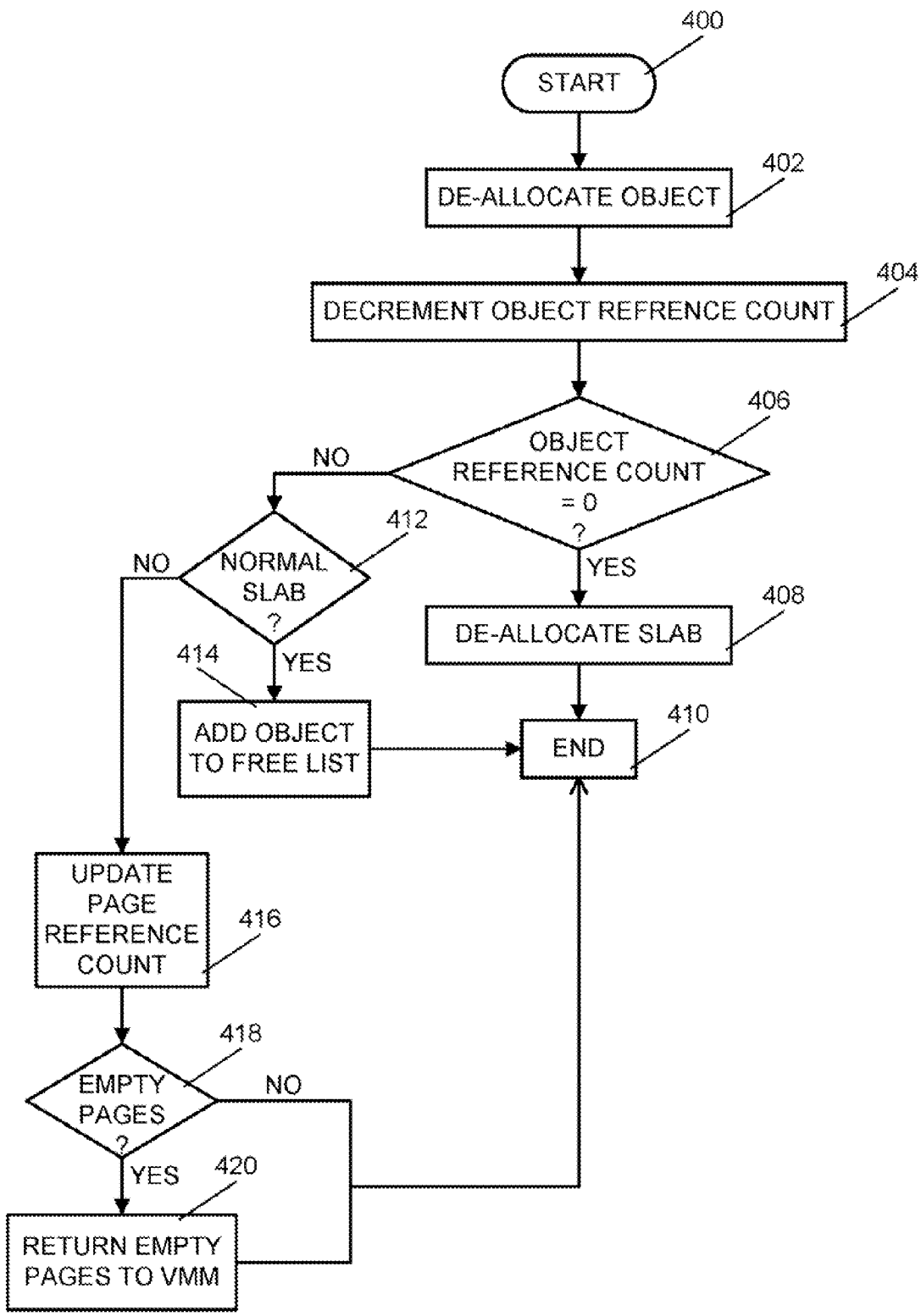
FIG. 4 is a flowchart of a process that may be used to implement the FREE function of the present invention.

FIG. 4 is a flowchart of a process that may be used to implement the FREE function of the present invention. The process starts when the function is called (step 400). Then the object to be freed is de-allocated and the object reference count in the header of the slab in which the object is being de-allocated is decremented (steps 402 and 404). After decrementing the object reference count, a check is made to determine whether the object count is equal to zero (0). If so, the slab will be de-allocated and the process ends (steps 406, 408 and 410).

If the object reference count is not equal to zero (i.e., the count is greater than zero), Then a check will be made to determine whether the slab is marked to be squeezed. If not, the object that has been freed is added to the free list of the slab header (steps 406, 412, 414 and 410).

If the slab has been marked to be squeezed, the page reference count array is updated. If there is not an empty page after de-allocating the object, the process then ends. If there is an empty page after the object is de-allocated, the empty page will be disclaimed before the process ends (steps 412, 416, 418, 420 and 410).

Figure 5:
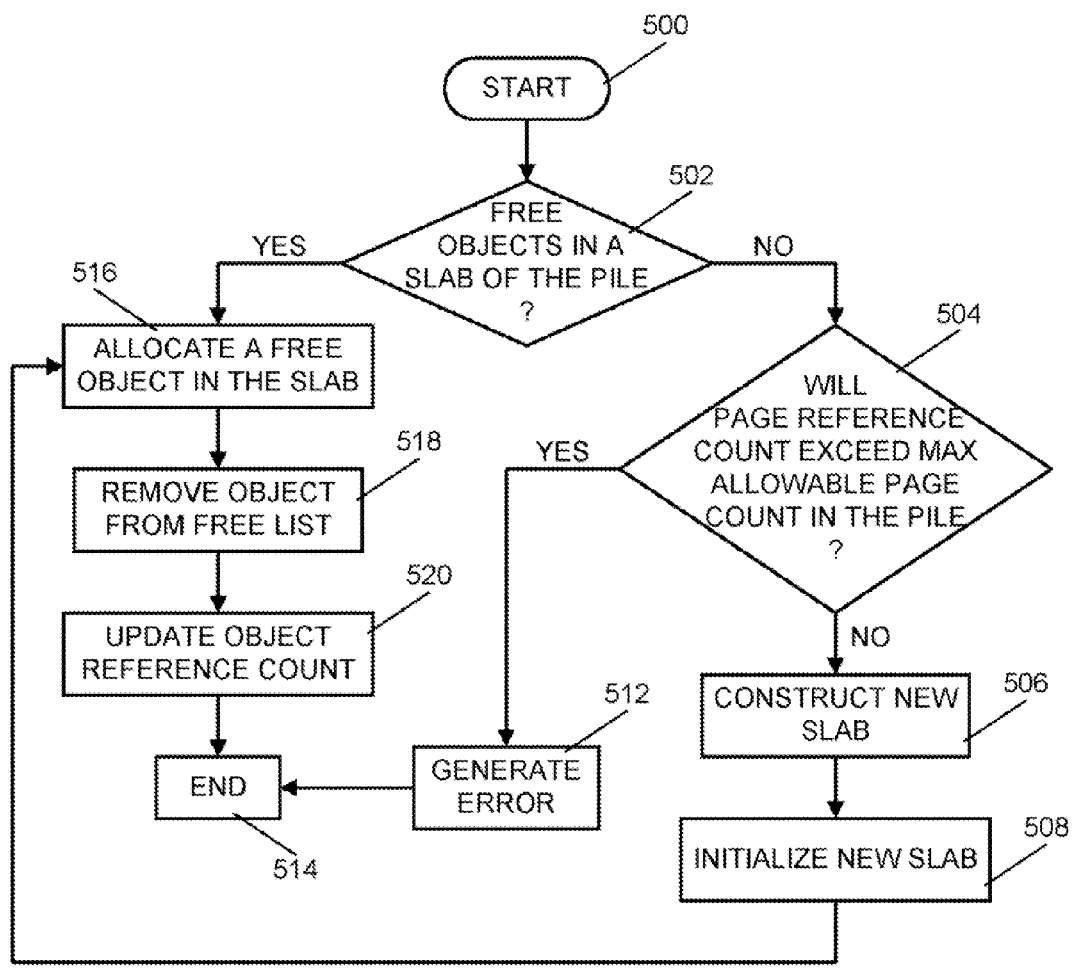
FIG. 5 is a flowchart of a process that may be used to implement the ALLOC function of the present invention.

FIG. 5 is a flowchart of a process that may be used to implement the ALLOC function of the present invention. The process starts when the function is called (step 500). Then a check is made to determine whether there is a free object in one of the slabs in the pile. If so, the free object will be allocated and the object will be removed from the free list in the slab header. The object reference count will also be updated before the process ends (steps 502, 516, 518, 520 and 514).

If there is not a free object in any of the slabs in the pile, a new slab will be constructed and initialized if the page reference count of the pile will not exceed the maximum allowable page count of the pile. After initializing the slab, the process will jump to step 516 (steps 502, 504, 506, 508 and 516). If the maximum allowable page count of the pile will be exceeded after constructing the new slab, the request will be denied by generating an error message before the process ends (steps 504, 512 and 514).

Figure 6:
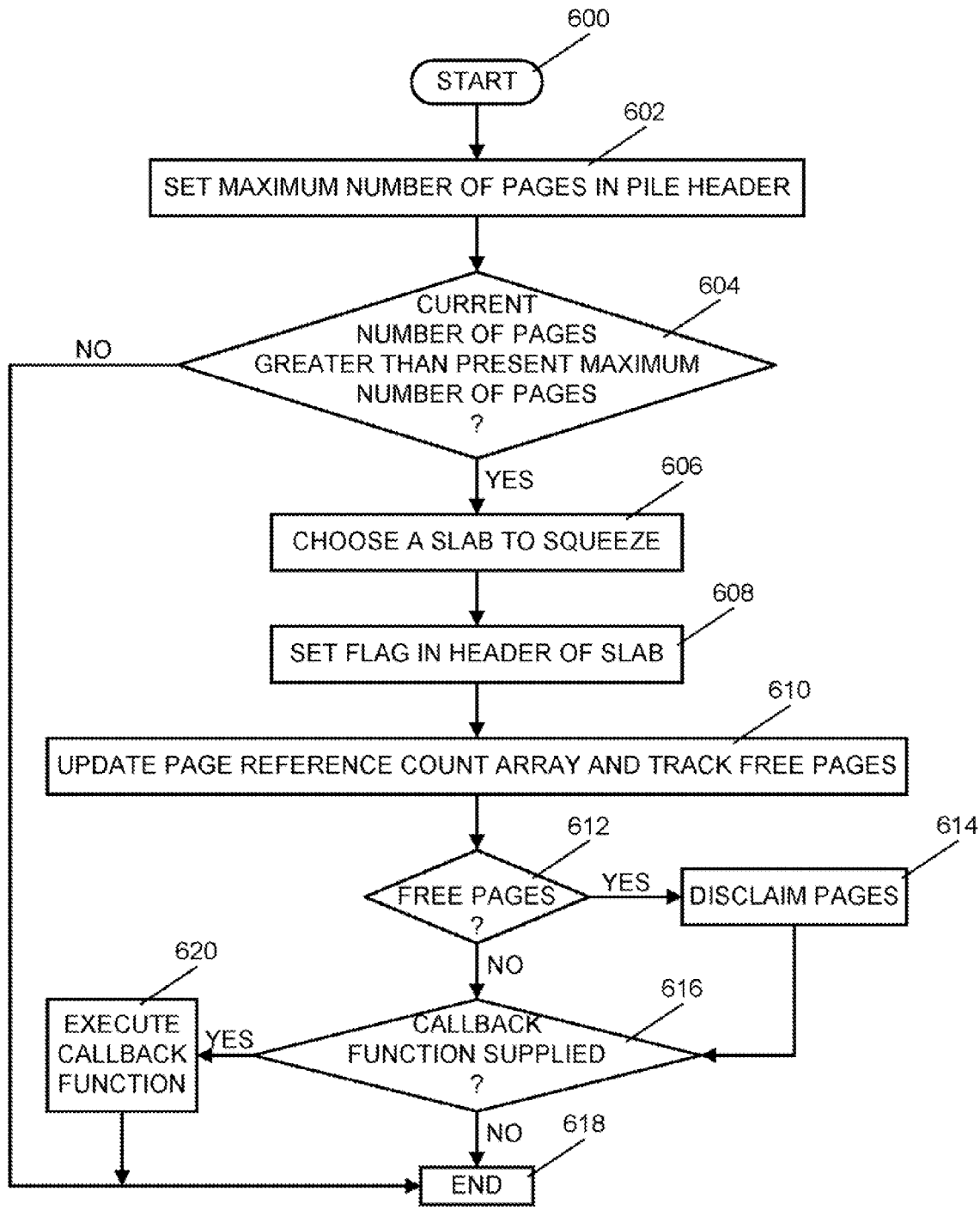
FIG. 6 is a flowchart of a process that may be used to implement the CONFIG_MAX function of the present invention.

FIG. 6 is a flowchart of a process that may be used to implement the CONFIG_MAX function of the present invention. The process starts when the function is called (step 600). The new maximum allowable page reference count will be entered into the header of the pile (step 602). Then a check is made to determine whether the current page reference count exceeds the new maximum allowable page reference count. If so, a slab will be chosen to be squeezed by setting the flag in the header of the slab and the page reference count array is then updated (steps 604, 606, 608 and 610). Then a check is made to determine whether there are any empty pages in the chosen slab. If so, the free pages will be disclaimed. Then, a check will be made to determine whether a callback function has been supplied. If not, the process ends (steps 612, 614 616 and 618). If there has been a callback function supplied, the function will be executed before the process ends (steps 616, 620 and 618). If there are not any free pages, the process will jump to step 616 (steps 612 and 616). Likewise, if the current page reference count is not greater than the new maximum page reference count, the process ends (steps 604 and 618).

Figure 7:
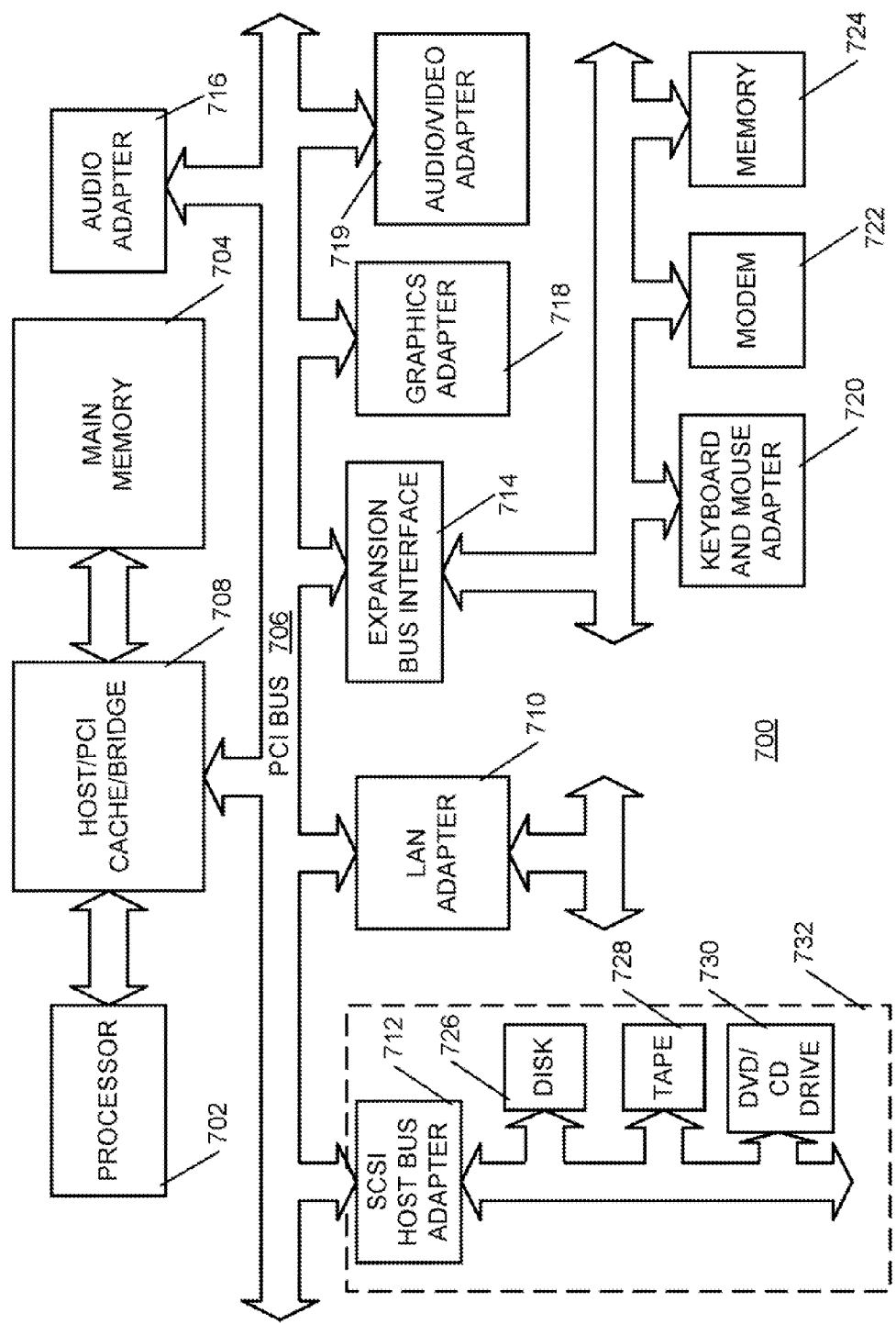
FIG. 7 is an exemplary block diagram of a computer system in which the invention may be implemented.

FIG. 7 is a block diagram illustrating a data processing system in which the present invention may be implemented. Data processing system 700 employs a peripheral component interconnect (PCI) local bus architecture. Although the depicted example employs a PCI bus, other bus architectures such as Accelerated Graphics Port (AGP) and Industry Standard Architecture (ISA) may be used. Processor 702 and main memory 704 are connected to PCI local bus 706 through PCI bridge 708. PCI bridge 708 also may include an integrated memory controller and cache memory for processor 702. Additional connections to PCI local bus 706 may be made through direct component interconnection or through add-in boards. In the depicted example, local area network (LAN) adapter 710, SCSI host bus adapter 712, and expansion bus interface 714 are connected to PCI local bus 706 by direct component connection. In contrast, audio adapter 716, graphics adapter 718, and audio/video adapter 719 are connected to PCI local bus 706 by add-in boards inserted into expansion slots. Expansion bus interface 714 provides a connection for a keyboard and mouse adapter 720, modem 722, and additional memory 724. Small computer system interface (SCSI) host bus adapter 712 provides a connection for hard disk drive 726, tape drive 728, and CD-ROM drive 730. Typical PCI local bus implementations will support three or four PCI expansion slots or add-in connectors.

An operating system runs on processor 702 and is used to coordinate and provide control of various components within data processing system 700 in FIG. 7. The operating system may be a commercially available operating system, such as Windows XP, which is available from Microsoft Corporation or AIX, which is an IBM product. An object oriented programming system such as Java may run in conjunction with the operating system and provide calls to the operating system from Java programs or applications executing on data processing system 700. "Java" is a trademark of Sun Microsystems, Inc. Instructions for the operating system, the object-oriented operating system, and applications or programs as well as the invention are located on storage devices, such as hard disk drive 726, and may be loaded into main memory 704 for execution by processor 702.

Those of ordinary skill in the art will appreciate that the hardware in FIG. 7 may vary depending on the implementation. Other internal hardware or peripheral devices, such as flash ROM (or equivalent nonvolatile memory) or optical disk drives and the like, may be used in addition to or in place of the hardware depicted in FIG. 7. Also, the processes of the present invention may be applied to a multiprocessor data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of squeezing slabs empty, a slab being a block of allocated memory space, the method comprising the steps of:
   determining whether a slab is to be squeezed empty; and
   precluding, if the slab is to be squeezed empty, data from being placed in any unused space of the slab.

2. The method of claim 1 wherein data is precluded from being placed in any space in the slab that becomes unused anytime thereafter.

3. The method of claim 2 wherein the slab is de-allocated when the slab becomes empty.

4. The method of claim 3 wherein precluding data from being placed in an unused space of the slab includes disclaiming the unused space.

5. The method of claim 4 wherein a collection of slabs is a pile, the pile having a maximum amount of allowable memory space that can be allocated thereto.

6. The method of claim 5 wherein if an application reduces the maximum amount of allowable memory space of a pile and the current amount of memory space exceeds the reduced maximum, at least one of the slabs in the pile is targeted to be squeezed empty.

7. The method of claim 6 wherein if the program requests advice as to which area of the allocated slab to be de-allocated, the advice is returned to the program.

* * * * *